June 24, 1930. L. HAEGE 1,765,975
ANIMAL TRAP
Filed Oct. 17, 1928 3 Sheets-Sheet 2

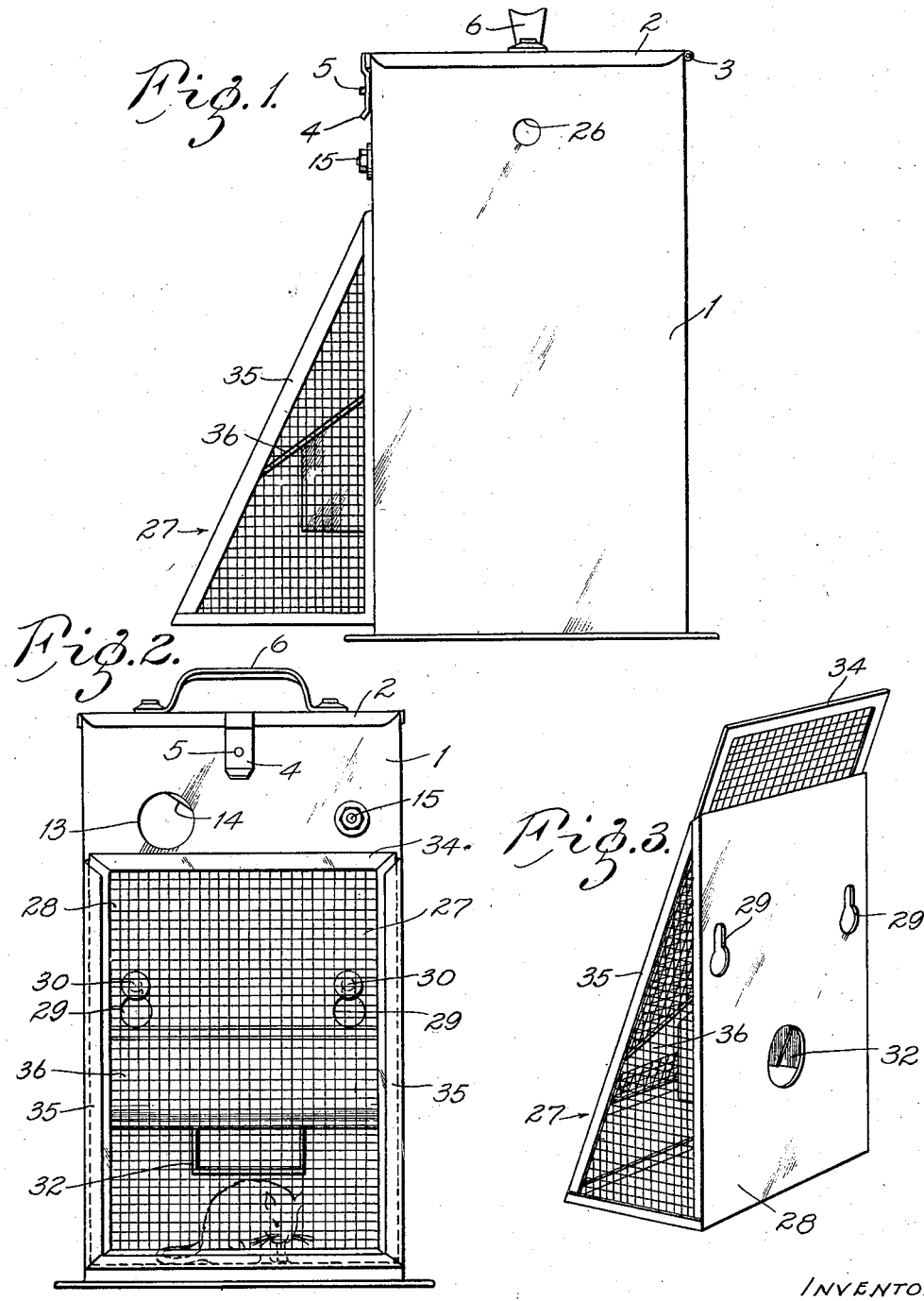

INVENTOR
LOUIS HAEGE.
By Albert J. McCauley
ATTORNEY.

June 24, 1930.  L. HAEGE  1,765,975
ANIMAL TRAP
Filed Oct. 17, 1928   3 Sheets-Sheet 3
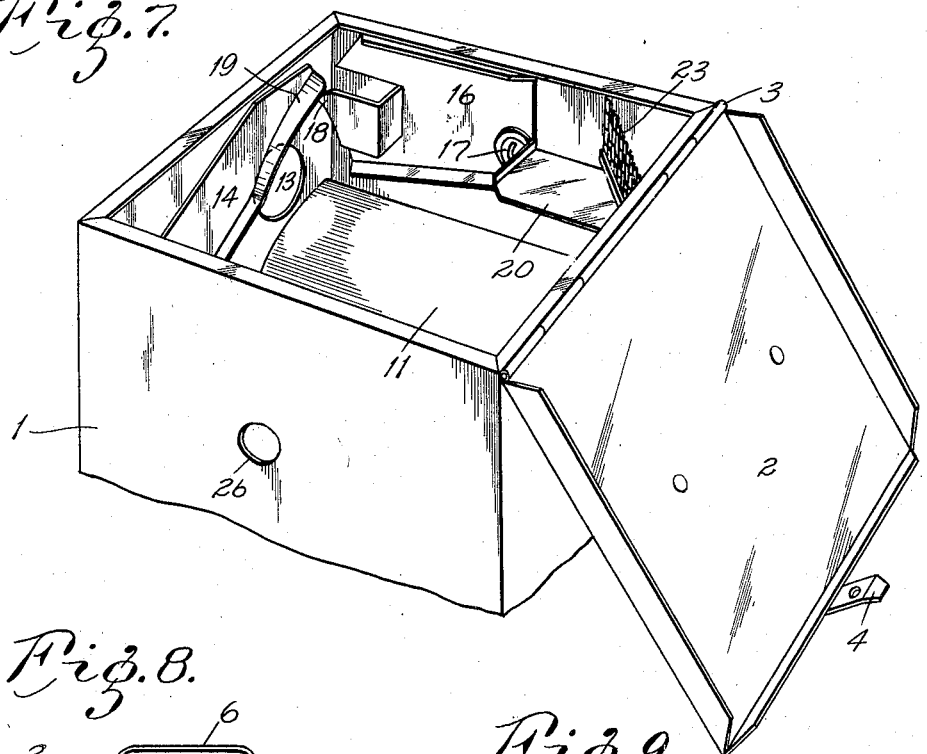
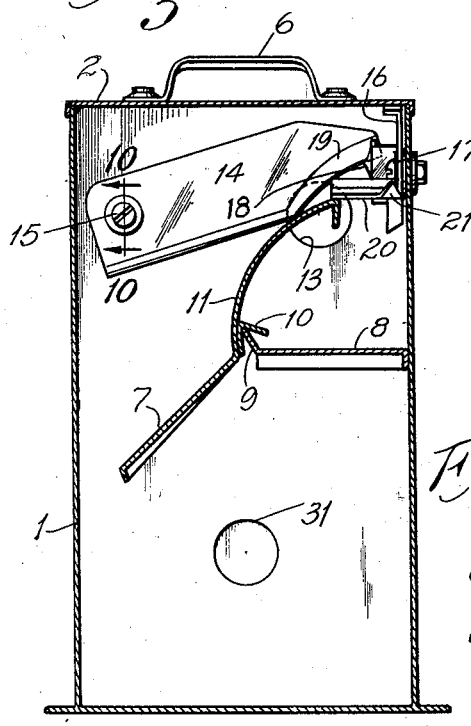
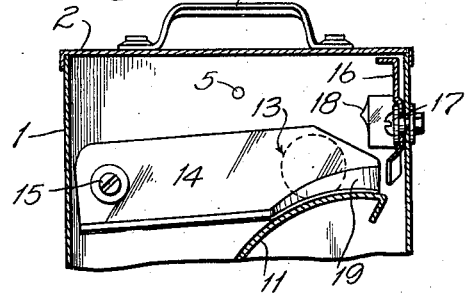
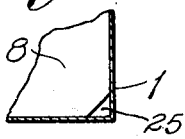
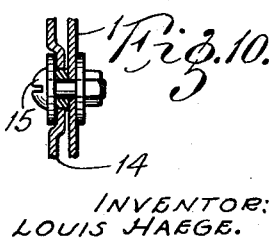
INVENTOR:
LOUIS HAEGE.
By Albert J. McCauley
ATTORNEY.

Patented June 24, 1930

1,765,975

UNITED STATES PATENT OFFICE

LOUIS HAEGE, OF NEW MEMPHIS, ILLINOIS

ANIMAL TRAP

Application filed October 17, 1928. Serial No. 312,942.

This invention relates to animal traps for use in catching mice, rats, and other animals.

One of the objects of the invention is to produce a self-setting trap wherein the animal passes through a series of compartments equipped with doors, or closures, so arranged that the animal can not return from one compartment to another. The doors, or closures, are automatically restored to prevent such return, and to leave the trap in condition to receive and confine other animals, without liability of releasing an animal from the trap.

Another object is to produce a trap provided with a cage wherein the trapped animals act as decoys to attract other animals to a compartment leading to the cage. The cage is preferably removable from the body of the trap, and it has a door to discharge the animals. The cage containing the trapped animals may be submerged in water to drown them, or the door may be opened while the animals are alive. When the cage is removed from the body of the trap, the animals are confined by a one-way door at the inlet of the cage, to prevent accidental release of the animals.

Further objects are to prevent the animals from removing the bait; to prevent accidental displacement of a trigger which extends below the bait holder, and to provide a trap in which the animal itself positively opens and resets the entrance door while passing from the first compartment to the second.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. 1 is a side view of a trap embodying the features of this invention.

Fig. 2 is a front view of the trap.

Fig. 3 is a perspective view showing the removable cage.

Fig. 7 is a perspective view of the upper portion of the trap, with the door at the top in its open position to show a closure for the entrance to the trap and a trigger which holds the closure in its open position.

Fig. 8 is a view similar to Fig. 6, showing the manner in which the closure is opened in response to a downward motion of the trap door.

Fig. 9 is a vertical section of the upper portion of the trap, showing the closure in its closed position.

Fig. 10 is a section taken approximately on the line 10—10 in Fig. 8.

Fig. 11 is a detail view showing a portion of the shelf which forms part of a partition in the housing.

Figure 4:
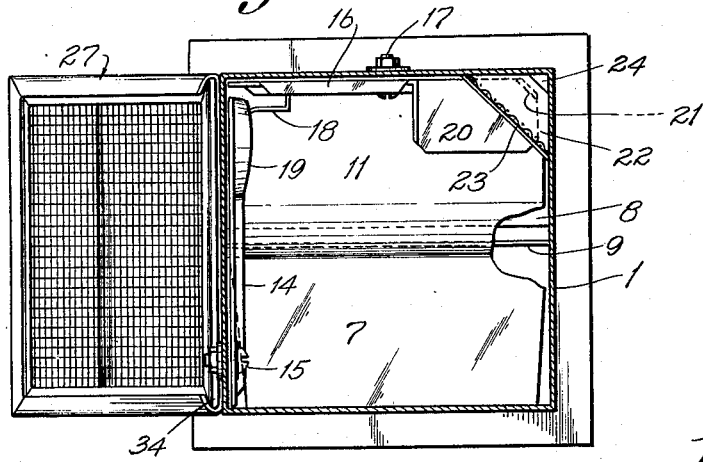
Fig. 4 is a section taken approximately on the line 4—4 in Fig. 5, a portion of the trap door being broken out to show its pivotal mounting.

To illustrate one form of the invention, I have shown a housing 1 having a door 2 at the top, the door being hinged at 3 (Fig. 7) and provided with a spring latch 4 adapted to snap on to a pin 5 (Figures 1 and 2) which extends from the front of the housing. A handle 6 is secured to the door 2.

To divide the housing into an upper and a lower compartment, I have shown a trap door 7 mounted on a shelf 8 (Figures 4, 6 and 8), said shelf having an upturned flange 9 near the middle of the housing. The pivotal support for the trap door 7 comprises a retaining strip 10 secured to the bottom of said trap door and resting upon the flange 9. The retaining strip is approximately in the form of an inverted V to receive the flange 9. The trap door is removably seated on the flange 9 so that it can be removed through the top of the housing to expose the lower compartment.

Figure 6:
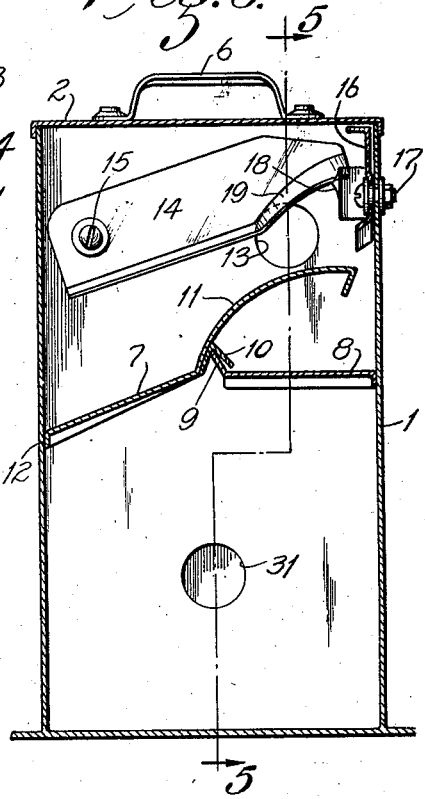
Fig. 6 is a section taken approximately on the line 6—6 in Fig. 5.

This trap door 7 (Fig. 6) has an extended wing 11 at one side of the pivotal support 9, 10, and this extension 11 is heavy enough to slightly overbalance the door proper, which normally engages the housing, as shown at 12 in Fig. 6.

The entrance to the upper compartment is shown at 13 in Figs. 5 to 9 inclusive.

A closure 14 in the upper compartment, is pivoted at 15 to the front wall of the housing, and this closure is adapted to drop by gravity to close the entrance 13, as shown in Fig. 9.

To retain the closure 14 in its open position, I have shown a trigger 16 in the form of a lever pivoted at 17 to a side wall of the housing, said trigger having an extension 18 at one end adapted to lie under a flange 19 which extends from the closure 14. This is shown most clearly in Fig. 7. The opposite end of the trigger 16 is provided with a platform 20 which may be moved downwardly, with the result of lifting the trigger extension 18 in an arc of a circle, thereby releasing the closure 14 and permitting it to drop by gravity to close the entrance 13.

To retain the trigger 16 in its operative position, the platform 20 has an upturned member 21 (Figures 4 and 5) which normally engages the bottom 22 of a bait holder. This upturned member 21 cooperates with the bottom 22 to limit the upward motion of the platform 20, and it separates said platform from the bait holder, so that the trigger will not be displaced by particles of material that may be dropped onto the platform.

The bait holder lies in one corner of the housing, and it is closed at the top by means of the hinged door 2. A screen 23 forms the front of the bait holder, so the animal can see the bait but cannot remove it from the holder.

Fig. 4 shows that the triangular bottom 22 of the bait holder is cut away at one corner of the housing to form an outlet 24 for grease, etc., which drops to the bottom of the housing, one corner of the shelf 8 being cut away to form an opening 25 (Fig. 11) through which this material passes.

After passing through the entrance 13, the animal may walk on the wing 11 of the trap door without displacing any of the parts, to the platform 20 which lies immediately below the bait holder. When the animal presses downwardly on this platform, the extension 18 at the opposite end of the trigger is moved upwardly from the position shown in Fig. 7, so as to release the closure 14 which then drops by gravity to close the entrance 13, as shown in Fig. 9. The closure 14 then rests upon the wing 11 which extends from the trap door 7. The animal is thus confined in the upper compartment of the housing.

As shown by Figures 1 and 7, a relatively small opening 26 is formed in the side wall of the housing which lies adjacent to the free lower edge of the trap door 7. The opening 26 is small enough to prevent escape of the animal, but the compartment is otherwise closed, so the animal will usually walk toward this opening 26, thereby passing onto the trap door 7, which moves downwardly to drop the animal into the lower compartment. Fig. 6 shows the trap door 7 in its closed position, and Fig. 8 shows how the trap door may be moved downwardly to drop the animal into the lower compartment. This trap door, due to the weight of its extended wing 11, will promptly return to the closed position shown in Fig. 7, so as to prevent the animal from passing back into the upper compartment.

I will now refer to the manner in which the trap door automatically opens the closure 14 and resets the trigger 16 so as to retain the closure in said open position, thus resetting the trap for the next animal.

The flange 19 on the closure 14 lies in the path of the wing 11 which extends from the trap door, and this wing moves upwardly when the trap door moves downwardly in response to the weight of the animal. The upward motion of said wing 11 restores the closure 14 as shown in Fig. 8, and since the trigger extension 18 lies at the relatively heavy end of the trigger 16, it will be apparent that when the closure 14 is moved upwardly its flange 19 will pass the extension 18 so as to lie above the same.

As a precaution to insure a resetting of the trap in the event that the trigger 16 should be retarded by friction as its pivot or by contact with a part of the housing, I have located the platform 20 in the path of the wing 11, as shown in Fig. 8. When this wing 11 is approaching its highest position, it contacts with the bottom of the platform to lift the same, thereby lowering the extension 18 at the opposite end of the trigger, to locate said extension 18 at a point below the flange 19 of the closure 14.

It will now be understood that the animal passes through the entrance 13 to the platform 20 adjacent to the bait which cannot be disturbed by the animal. Downward pressure on the platform 20 will release and drop the closure 14 to confine the animal, and thereafter, when the animal drops on the trap door 7, the trap is automatically reset for the next animal.

I will now refer to a cage 27 into which the animal passes from the lower compartment of the housing. This cage has a rear wall 28 (Fig. 3) provided with inverted key-hole slots 29 enlarged at the bottom to receive headed members 30 extending from the front of the housing and adapted to pass through said slots to detachably interlock the cage with the housing.

Figure 5:
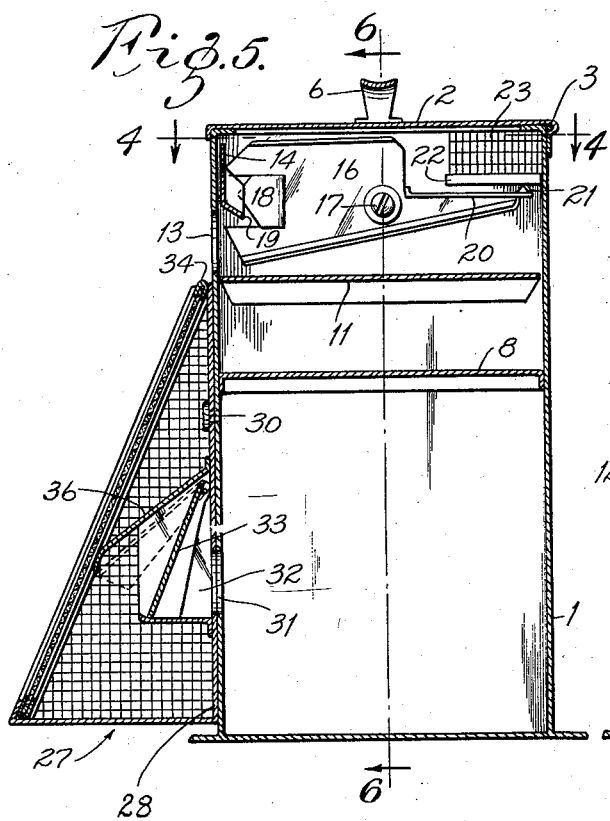
Fig. 5 is a section taken approximately on the line 5—5 in Fig. 6.

The lower compartment of the housing is provided with an exit 31 (Figures 5 and 6) and the cage is provided with an inlet passageway 32 registering with said exit. A one-way door 33 in this inlet passageway, is pivoted at the top and inclined inwardly from the pivot, to prevent return through said passageway. Dotted lines in Fig. 5 show how the door 33 is swung upwardly when the animal enters the cage. The door immediately drops by gravity to the position shown by full lines in Fig. 5.

The cage 27 has an inclined front wall in the form of a screen mounted in a frame 34, and this screen serves as a ladder on which the animals climb to the entrance 13.

The frame 34 of this inclined screen is slidable in guides 35 at the sides of the cage to serve as a door which is opened to discharge the animals. Fig. 3 shows how this door may be pulled upwardly to open the cage. It will be observed that the cage can not be applied to the housing while this door is open, as the upper edge of said door extends rearwardly from the top of the rear wall 28 when the door is open, as shown in Fig. 3, and this wall 28 is closely fitted to the front of the housing when the cage is attached to the housing. It will also be understood that the door just referred to can not be opened while the cage is secured to the housing, and the upper edge of the door frame 34 lies adjacent to the front of the housing, to prevent upward motion of the sliding door.

The inlet passageway 32 in the cage 27 (Figures 3 and 5) is provided with a top wall 36 made of sheet metal and having an outer edge which may be bent to frictionally engage the frame 34 of the slidable door.

I claim:

1. An animal trap comprising a housing having an upper compartment and a lower compartment, a trap door on which the animal passes from the upper to the lower compartment, said upper compartment being provided with an entrance, and a closure for said entrance, said closure being provided with an operating element in the path of a portion of said trap door, so as to open said closure in response to the opening of said trap door.

2. An animal trap comprising a housing having an upper compartment and a lower compartment, a trap door on which the animal passes from the upper to the lower compartment, said upper compartment being provided with an entrance, a closure adapted to drop by gravity to close said entrance, and a trigger holding said closure in its open position, said closure being provided with a flange in the path of a portion of said trap door, so as to open said closure in response to the opening of said trap door.

3. An animal trap comprising a housing having an upper compartment and a lower compartment, a trap door on which the animal passes from the upper to the lower compartment, said upper compartment being provided with an entrance, a pivotally supported closure adapted to drop by gravity to close said entrance, and a pivotally supported trigger having an extension to hold said closure in its open position, said trap door having an extension located below said trigger and closure and movable upwardly in response to a downward movement of said trap door, and said trigger and closure being provided with operating elements in the course of said extension, so as to restore the trigger and closure in response to said downward movement of the trap door.

4. An animal trap comprising a housing provided with an entrance, a closure adapted to drop by gravity to close said entrance, a pivotally supported trigger having an extension at one end to hold said trap door in its open position, the opposite end of said trigger being provided with a platform, a bait holder having a floor above said platform, a portion of said platform being extended upwardly to engage said floor when the trigger occupies its operative position, and said floor being provided with a grease-outlet at one corner of said housing.

5. An animal trap comprising a housing provided with an upper compartment having an entrance, a closure adapted to drop by gravity to close said entrance, a trigger holding said closure in its open position, said trigger including a platform whereby it is actuated to release the closure, a bait holder above and adjacent to said platform, and a trap door pivotally supported at the bottom of said upper compartment.

6. An animal trap comprising a housing provided with an upper compartment having an entrance, a closure adapted to drop by gravity to close said entrance, a trigger holding said closure in its open position, said trigger including a platform whereby it is actuated to release the closure, a bait holder above and adjacent to said platform, the bottom of said upper compartment being provided with a shelf having an upturned flange near the middle of said housing, and a trap door pivotally supported on said flange, said trap door having an extension leading from said entrance to a point near said platform.

7. An animal trap comprising a housing, a trap door pivotally supported in said housing and dividing it into an upper compartment and a lower compartment, said upper compartment being provided with an entrance, a closure adapted to drop by gravity to close said entrance, a trigger pivotally mounted in said upper compartment, said trigger having an extension at one end holding said closure in its open position and a platform at the opposite end whereby it is actuated to release the closure, said trap door having an extension located below said trigger and closure to restore said trigger and closure to their operative positions in response to the movement of the trap door, a bait holder adjacent to said platform, said lower compartment having an exit, and a cage at the front of said housing having an inlet passageway registering with said exit, said inlet passageway being provided with a door pivoted at the top and inclined inwardly from the pivot to prevent return through said passageway, said cage having a rear wall detachably interlocked with said housing and a door to release the animals.

8. An animal trap comprising a housing, a trap door pivotally supported in said housing and dividing it into an upper compartment and a lower compartment, said upper compartment being provided with an entrance, a pivoted closure adapted to drop by gravity to close said entrance, a trigger pivotally mounted in said upper compartment, said trigger having an extension at one end holding said closure in its open position and a platform at the opposite end whereby it is actuated to release the closure, said trap door having an extension located below said trigger and closure to restore said trigger and closure to their operative positions in response to the movement of the trap door, a bait holder above and adjacent to said platform, said lower compartment having an exit, a cage at the front of said housing having an inlet passageway registering with said exit, said inlet passageway being provided with a door pivoted at the top and inclined inwardly from the pivot to prevent return through said passageway, said cage having a rear wall provided with openings, and headed members extending from said housing and into said slots to detachably interlock said cage with said housing.

9. An animal trap comprising a housing, a trap door pivotally supported in said housing and dividing it into an upper compartment and a lower compartment, said upper compartment being provided with an entrance, a pivoted closure adapted to drop by gravity to close said entrance, a trigger pivotally mounted in said upper compartment, said trigger having an extension at one end holding said closure in its open position and a platform at the opposite end whereby it is actuated to release the closure, a bait holder above and adjacent to said platform, an opening being formed in the side of said compartment adjacent to the downwardly movable portion of said pivotally supported trap door where the trapped animal drops into said lower compartment, said lower compartment having an exit, and a cage at the front of said housing having an inlet passageway registering with said exit, said inlet passageway being provided with a door pivoted at the top and inclined inwardly from the pivot to prevent return through said passageway.

10. An animal trap comprising a housing a trap door pivotally supported in said housing and dividing it into a lower compartment and an upper compartment, said upper compartment being provided with an entrance, a pivoted closure adapted to drop by gravity to close said entrance, a trigger pivotally mounted in said upper compartment, said trigger having an extension at one end holding said closure in its open position and a platform at the opposite end whereby it is actuated to release the closure, a bait holder above and adjacent to said platform, an opening being formed in the side of said compartment adjacent to the downwardly movable portion of said pivotally supported trap door where the trapped animal drops into said lower compartment, said lower compartment having an exit, a cage at the front of said housing having an inlet passageway registering with said exit, said inlet passageway being provided with a door pivoted at the top and inclined inwardly from the pivot to prevent return through said passageway, said cage being detachably interlocked with said housing, said cage having an inclined front wall in the form of a screen leading to said entrance, and said screen being removable from said cage to release the animals.

In testimony that I claim the foregoing I hereunto affix my signature.

LOUIS HAEGE.